United States Patent [19]

de Bruin et al.

[11] 4,050,956
[45] Sept. 27, 1977

[54] CHEMICAL BONDING OF METALS TO CERAMIC MATERIALS

[75] Inventors: Henderikus Johannes de Bruin, Bellvue Heights; Charles Edward Warble, Glen Waverley, both of Australia

[73] Assignees: Commonwealth Scientific and Industrial Research Organization, Campbell; The Flinders University of South Australia, Bedford Park, both of Australia

[21] Appl. No.: 588,171

[22] Filed: June 18, 1975

Related U.S. Application Data

[63] Continuation-in-part of Ser. No. 360,848, May 16, 1973, abandoned, which is a continuation of Ser. No. 117,511, Feb. 22, 1971, abandoned.

[30] Foreign Application Priority Data

Feb. 20, 1970 Australia .............................. 0390/70

[51] Int. Cl.² .............................................. C23F 7/00
[52] U.S. Cl. ...................................... 148/6; 65/59 R; 148/31.5; 156/89; 228/193; 427/193; 428/433; 428/434

[58] Field of Search ................ 148/6, 31.5; 65/59 R; 156/89; 228/193, 122; 428/433, 434, 472; 427/193

[56] References Cited

U.S. PATENT DOCUMENTS

| | | | |
|---|---|---|---|
| 3,289,291 | 12/1966 | Reed ................................... | 65/59 R |
| 3,310,433 | 3/1967 | Tragert ............................... | 427/125 |
| 3,328,145 | 6/1967 | McMillan et al. ................... | 65/59 R |
| 3,497,384 | 2/1970 | Pirigyi ................................ | 427/125 |
| 3,517,437 | 6/1970 | Szobonya ........................... | 65/59 R |
| 3,531,853 | 10/1970 | Klomp ................................ | 228/193 |

*Primary Examiner*—Edward G. Whitby
*Attorney, Agent, or Firm*—Cushman, Darby & Cushman

[57] ABSTRACT

A refractory oxide ceramic is chemically bonded to a metal by disposing the surfaces to be joined in an abutting relationship and heating at least the abutting surfaces in air to a temperature below the melting point of the lowest melting component of the system, the temperature being sufficient to cause a chemical reaction between the ceramic oxide and the metal thereby forming a bond between the two abutting surfaces.

26 Claims, 3 Drawing Figures

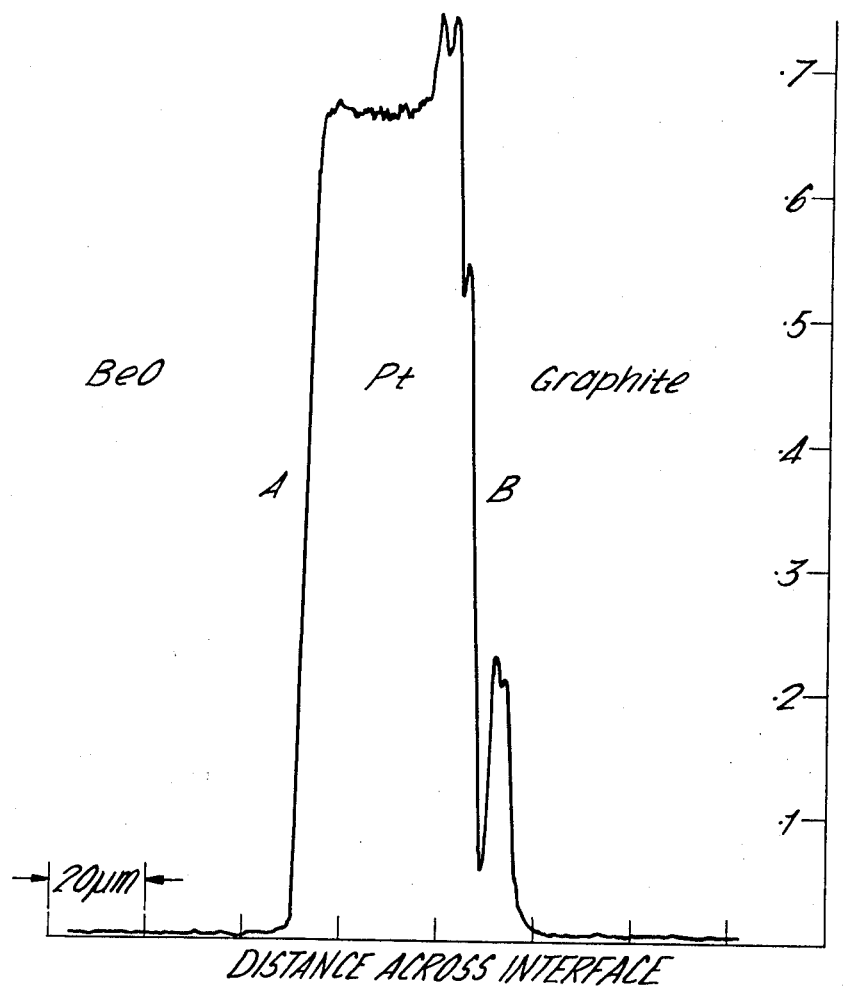

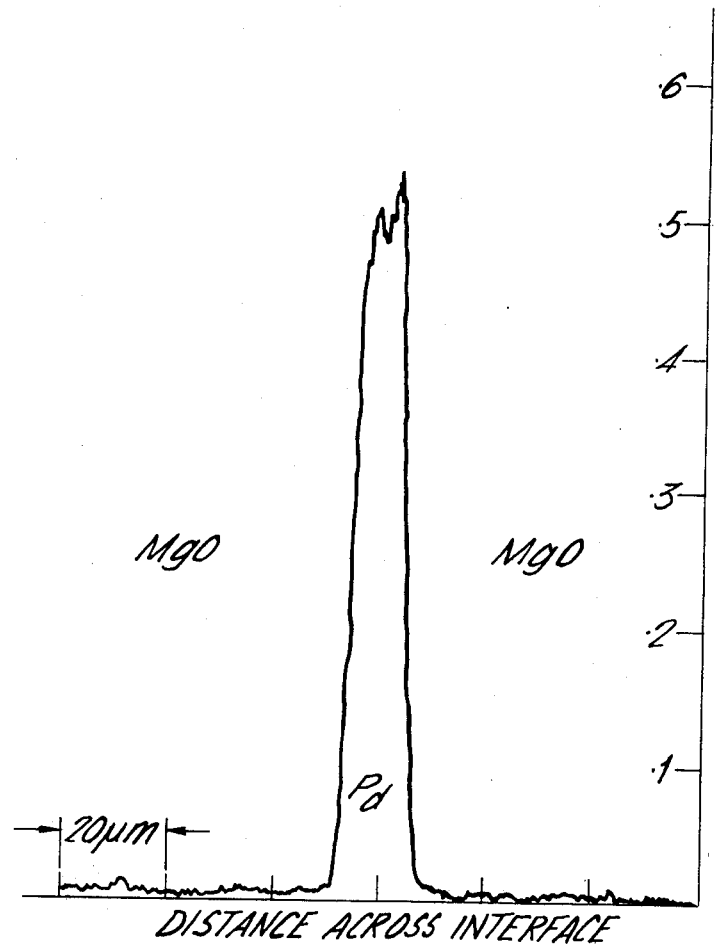

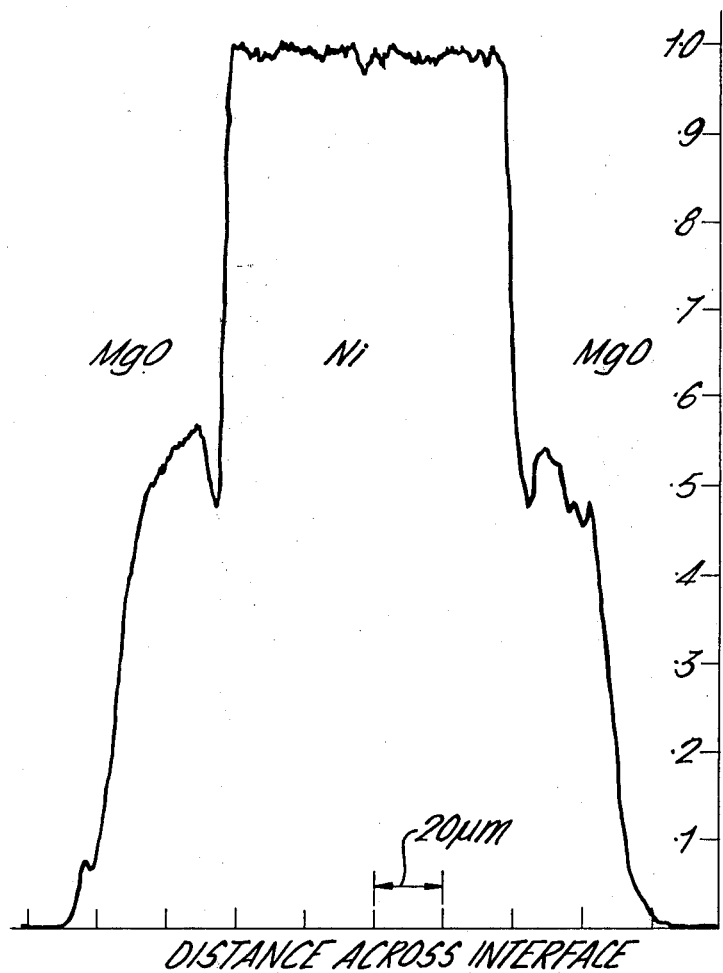

CHEMICAL BONDING OF METALS TO CERAMIC MATERIALS

CROSS REFERENCE TO RELATED APPLICATIONS

This application is a continuation-in-part of Ser. No. 360,848 filed May 16, 1973, now abandoned which in turn was a continuation of Ser. No. 117,511, filed Feb. 22, 1971 (now abandoned).

This invention relates to a method for forming chemical bonds between metals and ceramic materials, in particular refractory oxide ceramics. The method is applicable to the bonding of metal bodies to ceramic bodies or the formation of ceramic-metal-ceramic bonds for the purpose of joining two or more ceramic bodies.

As used herein the term "oxide ceramics" will be understood to refer to bodies formed from fused or sintered refractory oxides, especially the oxides of metals of Groups II, III, IV, and VIII of the Periodic Classification of the Elements (including certain metals of the rare earth and actinide series and metalloids, such as silicon).

Because of the difficulties in fabricating or machining ceramic bodies into complex shapes or of producing composite articles consisting of ceramics and/or metals of more than one type, it is often desirable to join identical or dissimilar ceramic bodies, either to themselves or to other ceramic or metal bodies. Ideally, the bonding method should give a bond of strength and other physical and chemical properties (e.g. melting point, chemical resistance) at least comparable with that of its component parts, but this is rarely achieved in practice. The prior art techniques for bonding of ceramic bodies fall into three main categories, namely:

1. The use of cements based on either inorganic or organic materials — these are used principally for low temperature applications, mainly for structural (low density) ceramics.
2. Brazing with metals or special alloys (e.g. titanium -based alloys) — used for high density "super refractories", especially in aerospace and nuclear energy applications.
3. Diffusion bonding, where a bonding medium is diffused into the ceramic components, without melting of either material.

Each of the above techniques has its particular disadvantages. Type (1) is only suitable for low temperature applications. Type (2) is limited in application because of difficulties in finding suitable metals or alloys which when molten will wet the surfaces of refractory ceramic materials. The type (3) method is essentially slow, being limited by the range of diffusion of the bonding material into the ceramic matrix. The present invention seeks to provide a new ceramic bonding technique which offers an alternative to the above described techniques and in which some of the disadvantages mentioned are overcome.

The invention is based on a hitherto unknown phenomenon involving a chemical reaction which occurs between certain refractory oxide ceramic materials and metals and which gives rise to a metal-ceramic bond of considerable strength.

As indicated above the oxides to which this invention relates are selected from Groups II, III, IV and VIII of the Periodic Classification of the Elements.

Examples of such oxides are: from Group II, BeO, MgO, CaO, and BaO; from Group III, $Al_2O_3$, $Sc_2O_3$, and the rare earth and actinide oxides such as $Ce_2O_3$, and $ThO_2$ and $UO_2$; from Group IV, $SiO_2$, $ZrO_2$ and $TiO_2$; and from Group VIII the oxides of iron, cobalt, nickel and ruthenium. These oxides may be in the chemically pure state or they may contain other oxides in chemical combination and/or physical admixture. By way of example of such combinations, there may be mentioned mixtures of the above-described oxides; mixed oxides, such as the natural and synthetic spinels; piezo-electric ceramics; magneto ceramics; including ferrites, garnets and magneto-plumbites; and synthetic and natural gem-materials, such as ruby and sapphire. As well as pure silicon dioxide, there may be exemplified natural and synthetic materials both crystalline and non crystalline, consisting principally of silicon dioxide with varying amounts of other oxides, such as quartz, fused silica and glasses, including borosilicate, lead and other special glasses, such as "Pyrex" and "C-9". Also as well as pure zirconium dioxide, the "stabilized" forms of zirconia containing varying amounts of other metal oxides, e.g. calcium oxide, are also included.

The metals concerned are broadly those of the so-called "Transition Series" of the Periodic Classification of the Elements. For the purposes of this specification the elements concerned are those having atomic numbers between 21 and 29 inclusive in the first transition series; between 39 and 47 inclusive in the second transition series; and between 57 and 79 inclusive in the third transition series.

Preferred metals in the method of the invention are those of Groups VIII and 1b of the Periodic Classification, that is the metals iron (Fe), cobalt (Co), Nickel (Ni), ruthenium (Ru), rhodium (Rh), palladium (Pd), iridum (Ir), platinum (Pt), copper (Cu), silver (Ag) and gold (Au).

In its broadest aspect, the invention provides a method for chemically bonding a body of a refractory oxide ceramic (as defined above) to a body of metal selected from the Transition Series (as defined above), which method comprises disposing selected surfaces of the bodies in abutting relationship and heating at least the abutting surfaces to a temperature below the melting point of the lowest melting component of the system but sufficient to bring about a chemical reaction leading to the formation of a bond between the surfaces.

The chemical reaction which occurs at the metal-ceramic interface is a vital and characteristic feature of the invention. This type of reaction was unknown hitherto. It cannot be observed by microscopic examination or under the light-optical microscope, but using the high resolution electron microscope, it is possible to observe the formation of a liquid-like phase in the contact zone between an oxide ceramic of the class defined above and a metal of the selected class, at temperatures well below the melting point of either component.

On the gross scale, the reaction is unobservable except for the formation of the strong bonds characteristic of the method of the invention.

It is important to note that the reaction between, and the concomitant bonding of the metal and the ceramic material, occurs at temperatures below the melting point of any component of the system. Melting of the metal is inimical to the method as the liquid phases of the metals concerned generally do not wet the surfaces of the relevant ceramic materials.

The bonds formed by the method of the invention when utilizing the so-called "noble" metals, such as platinum, palladium, silver and gold, can be readily distinguished from other types of bonding by microscopic and other examination of sections through the bond. The ceramic-metal interface is extremely sharply defined and there is a substantially complete absence of metal diffusion into the ceramic material. There are no indications of glassy intermediate phases, nor are there indications of any appreciable degree of wetting of the ceramic material by the metal. Under the light-optical microscope and the scanning electron microscope the metal-ceramic bonding is sharply defined and the interfaces are almost perfectly matched. The reaction zone between the metal and ceramic surfaces is smaller than the resolving power of the scanning electron microscope, i.e. less than about 250 A.

Using the scanning electron probe microanalyser, the characteristic X-rays of the metal are observed to cut off over a distance of less than $3\mu$ (i.e. the diameter of the scanning beam), thus further emphasizing the strikingly sharp discontinuity at the oxide/metal interface.

In the case of the other transition metals, e.g. Fe, Co or Ni, a somewhat different type of bond is observed. Although there is still a sharp discontinuity in the metal-ceramic interface, there is evidence of diffusion of the metal into the ceramic material. This is observable in some cases, e.g. for nickel, as a gradation of colour decreasing in intensity away from the interface. Light-optical and scanning electron microscopy shows a substantial diffuse layer between the metal and the oxide bodies and the electron microprobe analyser shows an abrupt decrease (about 50%) in the metal concentration at the interface but the metal continues to be detectable up to about $40\mu$ or thereabouts from the interface.

It must be emphasized, however that both types of bond are formed without melting of either component, and without the application of substantial pressure or the deformation of either material.

Utilizing the method of the invention, foils or massive bodies of the metals concerned may be thus bonded to ceramic bodies. Layers of the metal in powder form may be applied and sintered in situ. Metals not of themselves useful in the method may be bonded to ceramic bodies by first bonding a layer of one of the selected metals to the ceramic and subsequently joining the other metal to the bonded layer by standard metallurgical techniques such as soldering, brazing, welding, sintering, flame spraying, or the like, or by electrolytic deposition. Alternatively the selected metal may be applied as a layer to a body of another metal by any of the above mentioned techniques followed by bonding of the layer to the ceramic body by the method of the invention. Under some circumstances this type of ceramic-metal-metal composite structure may be produced in one operation by simply heating an assembly of the three components to bring about the essential bonding processes.

Similarly a metal-ceramic composite produced by the method of the invention may be bonded to a further ceramic body (which may be the same as or different to the first) by abutting a surface of the second ceramic body to the metal part of the composite and heating the structure according to the method of the invention.

The method of the invention also extends to the bonding of bodies of identical or dissimilar ceramic oxides by simultaneous reaction of a metal layer with both bodies.

The metal layer may be of any suitable thickness. Thin metal foils having a thickness of about 0.5 to 5 thousandths of an inch (0.012 to 0.12 mm) are often suitable but thicker or thinner layers may be used. Layers of metal powder may also be used.

The minimum temperature for the bonding reaction cannot be specified precisely but for most of the metals employed the reaction generally proceeds only slowly if at all at temperatures below about 800° C. The maximum temperature for the reaction is usually set by the melting point of the metal; for practical purposes, however, the usual working maximum is set at about 100° below the melting point and no advantage appears to be gained by using temperatures about this maximum. In most cases the bonding reaction proceeds at a satisfactory rate and good bonds are formed well below this working maximum temperature.

In carrying out this method of the invention the selected surfaces of the ceramic (and metal) bodies to be joined will normally be smooth and finished to match each other closely. Slight surface imperfections or mismatching as well as differences in thermal expansion for dissimilar bodies may be accommodated by using ductile metals such as platinum or gold. Best results are obtained however, with surfaces finished and matching to about 5 micrometers. Light to moderate pressure up to about 1 kg cm$^{-2}$ is usually applied to ensure close contact between the surfaces and the assembly is then heated while under pressure to the required temperature by any suitable means, for example, a flame such as oxy-acetylene or oxy-hydrogen, a furnace a furnace such as a muffle or tubular furnace, a high frequency induction heating device, or a plasma torch or furnace. The choice of atmosphere need only be compatible with the materials being bonded. Thus, for many metals, heating may be carried out in air at normal pressure. Others may require the use of reduced pressure or an inert atmosphere, e.g. nitrogen or a rare gas, such as argon.

U.S. Pat. No. 3,531,853 discloses the use of a hydrogen atmosphere in a process for forming a hermetic ceramic-to-metal seal. The use of an air atmosphere, according to the present invention, results in a different type of bond (as illustrated by differing visual appearances and depths of penetration of the metal into the ceramic), and, in many instances, a bond of increased strength, as compared to the use of a hydrogen atmosphere.

The time required for the bonding process depends on the choice of:
a. the ceramic oxide(s) involved
b. the bonding metal
c. the temperature
d. the atmosphere
e. the end application of the product For example a MgO/Pt/MgO or BeO/Pt/BeO bonded composite can be formed in 2 minutes in an oxy-hydrogen flame but an $Al_2O_3$/Fe (mild steel)/$Al_2O_3$ composite requires atleast 12 hours in a vacuum furnace at 1100° C.

The method of the invention can be used in any applications where metal-ceramic bonds are required, especially where high strength of the bond is required. For example, electronic capacitors for very high frequency applications can readily be fabricated by the method. Similarly, certain synthetic and natural gem materials, such as ruby and sapphire, can be bonded to suitable metal films to enable direct mounting, e.g. by soldering or welding to other metal bodies, such as in jewellery or in some scientific or technological applications. Electrodes and other conductive devices for high temperature applications, such as gas concentration cells for the measurement of gaseous impurities in metal melts, or temperature sensing devices can also be directly fabricated using the method of the invention. Other applications include the fabrication of solid state electronic or electromagnetic devices, e.g. the assembly of ferrite elements in computer memory cores, the production of optical or graded seals for use in vacuum tube and related technology. The stability of the bonds formed to nuclear radiation also suggest their use in the fabrication of fuel elements and other components in nuclear technology.

As indicated above, the method is applicable to the joining of ceramic bodies of identical or dissimilar composition. The choice of the metal used is governed by a combination of economic considerations and the performance required of the composite. For example for a bonded structure which must withstand very high temperatures or prolonged chemical attack, the chosen metal must be high melting and chemically inert, e.g. platinum. However, under less stringent conditions the cheaper metals, iron or nickel, will be equally satisfactory to platinum.

The invention also includes bonded ceramic-metal composites when produced by the method of the invention.

The formation and characterization of ceramic metal bonds in accordance with the invention is illustrated but not limited by the following examples.

1. METHOD FOR MAKING CERAMIC/METAL/CERAMIC COUPLES

The simplest geometry for testing a ceramic-metal bond is that of a metal foil covered on both sides by ceramic specimens, an entity later referred to as a couple. This simplifies the production of couples, as it avoids metal contact at high temperatures with any material other than the ceramic and it provides two similar interfaces that can be investigated simultaneously.

Suitable ceramic/metal/ceramic couples were prepared by sandwiching a 0.001 in. metal foil between the flat faces of two ceramic discs, 0.5 in (1.26 cm) diameter and 0.25 in. (0.63 cm) high. The specimens were placed between boron nitride anvils and the assembly was supported in the center of a nichrome or platinum wound tube furnace by means of alumina rods. A slight pressure (about 1 kg cm$^{-2}$) was applied to the assembly by releasing an air-cooled spring on top of the uppermost aluminum rod. The temperature was controlled with a Eurotherm proportional regulator to within 2° C of the required operating temperature.

The oxide cylinders were cold-pressed (20 t.s.i.) and sintered at 1500° C in dry nitrogen for 6 hours (for Al$_2$O$_3$ and MgO) or at 1750° C in hydrogen for 60 hours (for BeO). These high density polycrystalline compacts are specified in Table 1. The metal foils used were cold rolled and annealed, and are specified in Table II.

2. METHODS FOR TESTING AND EXAMINING BONDS

Relative shear strengths were determined by measuring the torque necessary to shear the couple. An applied torque was measured until failure of the couple occurred. The results are given in Table III.

The characteristic K$_\alpha$ radiation of the metal was monitored as an electron probe traversed the ceramic-metal interfaces. The sectioned couples had been polished and carbon-coated. A JEOL model JXA3 electron probe microanalyser was used with an accelerating voltage of 25 kV and a specimen current of 0.1 $\mu$A. The beam resolution was 1.5 $\mu$m and the rate of traverse 10 $\mu$m min$^{-1}$.

An electron probe trace, monitored for Pt K$_\alpha$ radiations, BeO/Pt/graphite couple is shown in FIG. 1. This couple had been heated in vacuum at 1500° C for 17 hours, without pressure. The most striking feature is the absence of metal diffusion into the ceramic. The characteristic X-rays are cut off abruptly at the interface over a distance of less than 3 $\mu$m, which is only nominally greater than the resolution of the microanalyzer. Platinum has moved however into the pores of the graphite as indicated by the peaks near the Pt/graphite interface.

FIG. 2 shows a Pd K$_\alpha$ probe trace for a MgO/Pd/MgO couple. The couple was heated at 1100° C for 16 hours in air under a pressure of approximately 1 kg cm$^{-2}$.

In these probe traces, and in micrographs the sharp discontinuity at the oxide/metal interface was most striking. There was not evidence of any interdiffusion whatsoever and the oxide/metal contact was almost perfect.

FIG. 3 is an electron probe trace of a MgO/Ni/MgO couple, that had been heated in air at 1100° C for 16 hours under a 1 kg cm$^{-2}$ pressure. The Ni K$_\alpha$ signal in the probe scan reduces abruptly to 50% at the interface and the signal then decreases gradually to zero over a distance of some 40 $\mu$m.

Polarized light optical and emissive (filtered) scanning electron micrographs, of the same couple confirm the extent of the substantial diffuse layer between the metal and the original oxide.

The considerable adhesion at the bonded interface is shown in the results for relative shear strengths in Table III.

Most couples collapsed by failure in the ceramic phase. Some appreciation of these values may be obtained from the final value for the epoxy-resin-bonded Al$_2$O$_3$ couple.

Table I

| | Specification of Ceramic Oxide Specimens | | | |
|---|---|---|---|---|
| Material | Origin | Relative density % | Impurity Content (p.p.m.) | Average grain size $\mu$m |
| Al$_2$O$_3$ | Linde "A" | 97.1 | Mg(10), Cu(100), Fe(500), Si(100) | 55 |
| MgO | Merck's AR MgCO$_3$ calcined at 900° for 1 hr. | 95.0 | Fe(20), Zn(50), Al(50), Ba(10), Cu(500), Pb(10) | 45 |
| BeO | UOX | 96.8 | Al(15), Fe(200), Mg(9), Pb(20), Si(250), Ba(5) | 60 |
| ZrO$_2$ Scandia | | | | |

Table I-continued

Specification of Ceramic Oxide Specimens

| Material | Origin | Relative density % | Impurity Content (p.p.m.) | Average grain size μm |
|---|---|---|---|---|
| stabilized) | | | | |
| $SiO_2$[a] | | | | |
| Glass[b] | | | | |
| Brick[c] | | | | |

[a] as crystalline quartz, vitreous silica and fused silica
[b] various glasses, such as Pyrex and C-9
[c] common modular building brick.

Table II

Specification of Metal Foils

| Metal | Thickness | Purity % | Major impurities in order of significance |
|---|---|---|---|
| Au | 0.002 | 99.3+ | Cu, Ag, and As |
| Pd | 0.0005 | 99.5 | Ni, Pt |
| Pt | 0.002 | 99.9+ | Pd, Ni |
| Ni | 0.004 | 99.3 | Fe, Co |
| Ag | 0.005 | | |
| Cu | 0.005 | | |
| Ti | 0.005 | | |
| Fe | 0.005 (mild steel) | | |

TABLE III

| Couple | Temperature (° C) | Atmosphere | Time (hours) | Torque (in. lb.) |
|---|---|---|---|---|
| $Al_2O_3$/Araldite/$Al_2O_3$ | — | — | — | 108* |
| $Al_2O_3$/Ti/$Al_2O_3$ | 1350 | air ($10^{-3}$ Torr.) | 16 | — |
| $Al_2O_3$/Pd/$Al_2O_3$ | | | | |
| $Al_2O_3$/Pt/$Al_2O_3$ | 835 | air | 16 | <1 |
| $Al_2O_3$/Pt/$Al_2O_3$ | 1016 | air | 16 | 53* |
| $Al_2O_3$/Pt/$Al_2O_3$ | 1055 | air | 16 | 108* |
| $Al_2O_3$/Au/$Al_2O_3$ | 1000 | air | 4 | 69* |
| $Al_2O_3$/Ni/$Al_2O_3$ | 1050 | air | 2 | 29 |
| $Al_2O_3$/Ni/$Al_2O_3$ | 1100 | air | 2 | 65 |
| $Al_2O_3$/Ni/$Al_2O_3$ | 1055 | air | 16 | 44 |
| $Al_2O_3$/Ni/$Al_2O_3$ | 1150 | air | 2 | 39 |
| $Al_2O_3$/Ni/$Al_2O_3$ | 1155 | air | 17 | 55* |
| MgO/Pt/MgO | 810 | air | 16 | 0.2 |
| MgO/Pt/MgO | 960 | air | 2 | >40* |
| MgO/Pt/MgO | 1090 | air | 2 | 46* |
| MgO/Ni/MgO | | | | |
| MgO/Pd/MgO | | | | |
| Pt/MgO/Pt | 1100 | air | 24 | — |
| $ZrO_2$/Pt/$ZrO_2$ (stab-ilised) (stabilised) | | | | |
| Brick/Ni/Brick | 975 | air | 13 | — |
| Glass/Au/Glass | | see note (d) | | |
| $SiO_2$/Au/Glass (fused) | | see note (d) | | |
| $SiO_2$/Pt/$SiO_2$ (vitreous) (vitreous) | | | | |
| $SiO_2$(v)/Au/$SiO_2$(v) | 970 | air | 5 | 36 |
| $SiO_2$(v)/Ag/$SiO_2$(v) | 907 | air | 5 | 29* |
| $SiO_2$(v)/Cu/$SiO_2$(v) | 1000 | air | 16 | — |
| $UO_2$/Pt/BeO | 1250 | Argon (10 Torr.) | 16¼ | — |
| BeO/Fe/MgO (mild steel) | 1100 | air | 17¼ | — |
| BeO/Ni/BeO | 1100 | air | 17 | 85* |
| $Al_2O_3$/Ni/BeO/Pt/$Al_2O_3$ | | | | |
| $NiO_2$/Cu/BeO/Au/$SiO_2$ (vitreous) (vitreous) | 1000 | air | 15¾ | — |

*Specimen fractured in the ceramic phase not at the bond; in these cases it is evident that the bond is stronger than the ceramic specimen. The strengths of the specimens varied because of previous histories.
(d) Heating in air by r.f. heater for 30 seconds. For glass temperature was just under softening point, i.e. about 775° C for C-9 and about 820° C for Pyrex. $SiO_2$ fused to Au at about 1040° C, then glass to Au as above.

Some indications of specific applications of the above-described couples are as follows:

$UO_2$Pt/BeO — A fuel element for a nuclear reactor comprising a core of fusible $UO_2$ having an integral moderating shield of BeO bonded to the core by Pt.

Scandia-stabilized $ZrO_2$/Pt — Bonded electrode/solid electrolyte elements for high temperature applications, e.g. fuel cells, oxygen concentration probes.

Brick/Ni/brick — Joining of bricks in highly stressed positions.

Quartz/Au/glass — Replacement of graded seals in, for example, the production of spectral lamps and other electrical or electronic devices. Bonding of electrical heating elements to quartz, glass or glass-ceramic materials.

$Al_2O_3$/Ni, Fe, or Pt — Bonding of particulate $Al_2O_3$ for abrasive applications.

We claim:

1. A method for chemically bonding a body of a refractory oxide ceramic selected from the group consisting of oxides of metals of groups II, III, IV and VIII of the Periodic Classification of the Elements and mixtures of such oxides, in chemical combination and physical admixture to the body of a metal selected from the group consisting of metals having atomic numbers between 21 and 29 inclusive in the first transition series between 39 and 47 inclusive in the second transition series and between 57 and 79 inclusive in the third transition series; the method comprising disposing selected surfaces of the bodies to be bonded in abutting relationship and heating at least the abutting surfaces in an atmosphere consisting of air to a temperature below the melting point of the lowest melting component of the system, the temperature sufficient to bring about a chemical reaction between the ceramic oxide and the metal thereby forming a bond between the said surfaces.

2. A method as claimed in claim 1, wherein heating of the surfaces is carried out in air at normal or reduced pressure.

3. A method as claimed in claim 1, wherein the oxide is selected from the group consisting of BeO, MgO, CaO, BaO, $Al_2O_3$, $Sc_2O_3$ the rare earth and actinide oxides, $SiO_2$, $ZrO_2$, $TiO_2$ and the oxides of iron, cobalt, nickel and ruthenium.

4. A method as claimed in claim 1, wherein the metal is selected from the group consisting of Fe, Co, Ni, Ru, Rh, Pd, Ir, Pt, Cu, Ag, and Au.

5. A method as claimed in claim 4, wherein the said oxide is in chemical combination or physical admixture with other oxides.

6. A method as claimed in claim 4, wherein the metal is Pd, Pt or Au and the bond formed is characterized by a sharp discontinuity at the metal-ceramic interface and the depth of diffusion of the metal into the ceramic material is less than about 250 A.

7. A method as claimed in claim 4, wherein the metal is Fe, Co or Ni and the bond formed is characterized by a sharp discontinuity at the metal-ceramic interface and diffusion of the metal into the ceramic material, the metal being detectable in the ceramic body up to about 40μm from the interface.

8. A method as claimed in claim 1, wherein the abutting surfaces are heated to a temperature not less than 100° C below the melting point of the metal.

9. A ceramic-metal composite body produced according to the method of claim 1 wherein the bond between the ceramic and the metal is characterized by a sharply defined metal-ceramic interface from which the depth of diffusion of the metal into the ceramic material is less than 250 A.

10. A ceramic-metal composite body produced according to the method of claim 1 wherein the bond between the ceramic and the metal is characterized by a sharply defined metal-ceramic interface with diffusion of the metal into the ceramic material, the metal being detectable in the ceramic body up to about 40 μm from the interface.

11. Method of claim 1, wherein the body of refractory oxide ceramic is of $Al_2O_3$, and said metal is platinum.

12. Method of claim 1, wherein said metal is platinum.

13. Metal of claim 1 wherein said metal is iron.

14. Method of claim 1, wherein said metal is cobalt.

15. Method of claim 1, wherein said metal is gold.

16. Method of claim 1, wherein said metal is a noble metal.

17. A metal for chemically bonding a body of a refractory oxide ceramic selected from the group consisting of oxides of metals of groups II, III, IV and VIII of the Periodic Classification of the Elements and mixtures of such oxides, in chemical combination and physical admixture of the body of a metal foil selected from the group consisting of metals having atomic numbers between 21 and 29 inclusive in the first transition series, between 39 and 47 inclusive in the second transition series, and between 57 and 79 inclusive in the third transition series, the method consisting of:

disposing selected surfaces of said body of a refractory oxide ceramic and said body of a metal foil to be bonded in abutting relationship, and heating at least the abutting surfaces in an atmosphere consisting of air to a temperature below the melting point of the lowest melting component of the system, the temperature sufficient to bring about a chemical reaction between the ceramic oxide and the metal thereby forming a bond between the abutting surfaces.

18. A method as claimed in claim 17, including heating at least the abutting surfaces in an atmosphere consisting of air to a temperature no greater than 100° C. below the melting point of the lowest melting component of the system.

19. A method as claimed in claim 17, wherein heating of the abutting surfaces is carried out in air at normal reduced pressure.

20. A method as claimed in claim 17, wherein the oxide is selected from the group consisting of BeO, MgO, CaO, BaO, $Al_2O_3$, $Sc_2O_3$, the rare earth and actinide oxides, $SiO_2$, $ZrO_2$, $TiO_2$ and the oxides of iron, cobalt, nickel and ruthenium.

21. A method as claimed in claim 17, wherein the metal is selected from the group consisting of Fe, Co, Ni, Ru, Rh, Pd, Ir, Pt, Cu, Ag and Au.

22. A method as claimed in claim 21, wherein the said refractory oxide is in chemical combination or physical admixture with other oxides.

23. A method as claimed in claim 21, wherein the metal is Pd, Pt or Au and the bond formed is characterized by a sharp discontinuity at the metal-ceramic interface and the depth of diffusion of the metal into the refractory oxide ceramic material is less than about 250A.

24. A method as claimed in claim 17, wherein the metal is Fe, Co or Ni and the bond formed is characterized by a sharp discontinuity at the metal-ceramic interface, and diffusion of the metal into the refractory oxide ceramic material being detectable in said refractory oxide ceramic material up to about 40 μm from the metal-ceramic interface.

25. A ceramic-metal composite body produced according to the method of claim 17, wherein the bond between the ceramic and the metal is characterized by a sharply defined ceramic-metal interface from which the depth of diffusion of the metal into the ceramic material is less than 250 A.

26. A ceramic-metal composite body produced according to the method of claim 17, wherein the bond between the ceramic and the metal is characterized by a sharply defined metal-ceramic interface with diffusion of the metal into the ceramic material being detectable in the ceramic material up to about 40 μm from the interface.

* * * * *